US010392065B2

(12) United States Patent
Shenkerman

(10) Patent No.: US 10,392,065 B2
(45) Date of Patent: Aug. 27, 2019

(54) BICYCLE SEAT AND LOCK ASSEMBLY

(71) Applicant: Ino Vision Ltd., Herzliya (IL)

(72) Inventor: Michael Shenkerman, Rishpon (IL)

(73) Assignee: Ino Vision Ltd., Herzliya (IL)

( * ) Notice: Subject to any disclaimer, the term of this patent is extended or adjusted under 35 U.S.C. 154(b) by 167 days.

(21) Appl. No.: 15/319,081

(22) PCT Filed: Jun. 15, 2015

(86) PCT No.: PCT/IB2015/054501
§ 371 (c)(1),
(2) Date: Dec. 15, 2016

(87) PCT Pub. No.: WO2015/193785
PCT Pub. Date: Dec. 23, 2015

(65) Prior Publication Data

US 2017/0120976 A1 May 4, 2017

Related U.S. Application Data

(60) Provisional application No. 62/012,478, filed on Jun. 16, 2014.

(51) Int. Cl.

| | |
|---|---|
| ***B60N 2/38*** | (2006.01) |
| ***B62H 5/00*** | (2006.01) |
| ***B62J 1/00*** | (2006.01) |
| ***B62J 1/08*** | (2006.01) |
| ***B62H 5/14*** | (2006.01) |

(52) U.S. Cl.
CPC ............... *B62H 5/001* (2013.01); *B62H 5/00* (2013.01); *B62H 5/005* (2013.01); *B62H 5/14* (2013.01); *B62J 1/00* (2013.01); *B62J 1/08* (2013.01)

(58) Field of Classification Search
CPC ......... B62J 1/00; B62J 1/08; B62J 1/18; B62J 1/22; B62J 1/20; B62J 9/006; B62J 1/02; B62H 5/00; B62H 5/001; B62H 5/14; B62H 5/005
USPC ...... 297/215.14, 199, 195.1, 215.16, 195.13, 297/215.12
See application file for complete search history.

(56) References Cited

U.S. PATENT DOCUMENTS

| | | | |
|---|---|---|---|
| 597,055 | A | 1/1898 | Levi |
| 4,223,905 | A | 9/1980 | Persons |

(Continued)

FOREIGN PATENT DOCUMENTS

| | | |
|---|---|---|
| CN | 201179909 | 1/2009 |
| CN | 201512045 | 6/2010 |

(Continued)

OTHER PUBLICATIONS

PCT Written Opinion PCT/IB2015/054501, dated Oct. 9, 2015.
Seatylock: "How to use seatylock", Jan. 31, 2014, retrieved from the Internet http://www.youtube.com/watch?v=V51DGab1KRg.

*Primary Examiner* — Chi Q Nguyen
(74) *Attorney, Agent, or Firm* — Dekel Patent Ltd.; David Klein

(57) ABSTRACT

A bicycle seat assembly includes a bicycle seat including a front portion and a rear portion and rear portion and mounting platform attachable to a bicycle seat post or seat post adaptor of a bicycle. One portion of the bicycle seat releasably attaches to a portion of the mounting platform and another portion of the bicycle seat releasably attaches to another portion of the mounting platform.

15 Claims, 15 Drawing Sheets

(56) References Cited

U.S. PATENT DOCUMENTS

| | | | | |
|---|---|---|---|---|
| 4,387,925 | A * | 6/1983 | Barker | B62J 1/002 297/195.13 |
| 5,405,159 | A * | 4/1995 | Klein | B62J 1/02 280/283 |
| 5,618,052 | A * | 4/1997 | Rendall | B62J 1/08 280/288.4 |
| 5,676,420 | A * | 10/1997 | Kuipers | B62J 1/10 297/195.1 |
| 5,678,435 | A | 10/1997 | Hodson | |
| 5,775,710 | A * | 7/1998 | Yu | B62J 1/08 280/283 |
| 6,036,214 | A * | 3/2000 | Ono | B62H 1/02 280/288.4 |
| 6,183,043 | B1 * | 2/2001 | Nelson | B62J 1/005 297/201 |
| 6,761,400 | B2 * | 7/2004 | Hobson | B62J 1/005 297/195.1 |
| 6,827,397 | B1 | 12/2004 | Driver | |
| 7,059,673 | B1 * | 6/2006 | Lee | B62J 1/00 297/195.1 |
| 7,192,085 | B2 * | 3/2007 | Lee | B62J 1/00 297/195.1 |
| 7,547,064 | B2 * | 6/2009 | Garneau | B62J 1/00 297/195.1 |
| 7,717,505 | B2 * | 5/2010 | Yu | B62J 1/20 297/202 |
| 7,735,916 | B2 * | 6/2010 | Yu | B62J 1/20 297/195.1 |
| D663,540 | S | 7/2012 | Livne | |
| 8,371,649 | B2 * | 2/2013 | Segato | B62J 1/00 297/215.16 |
| 2007/0138846 | A1 * | 6/2007 | Ritchey | B62J 1/08 297/215.14 |
| 2008/0011031 | A1 * | 1/2008 | Chuang | B62H 5/00 70/233 |
| 2010/0187868 | A1 | 7/2010 | Livne | |
| 2012/0161480 | A1 | 6/2012 | Lu et al. | |
| 2012/0292959 | A1 | 11/2012 | Sajonia | |
| 2014/0230498 | A1 | 8/2014 | Elson | |
| 2015/0035326 | A1 * | 2/2015 | Wong | B62J 1/28 297/195.1 |

FOREIGN PATENT DOCUMENTS

| | | |
|---|---|---|
| CN | 201907592 | 7/2011 |
| CN | 203172768 | 9/2013 |
| CN | 203381716 | 1/2014 |
| DE | 10023978 | 11/2001 |
| EP | 1693288 | 8/2006 |
| EP | 1937539 | 7/2008 |
| EP | 2366611 | 9/2011 |
| JP | H01142389 | 9/1989 |
| JP | H05-005689 | 1/1993 |
| JP | H11-001189 | 1/1999 |
| JP | 2002-347678 | 12/2002 |
| JP | 2003048581 | 2/2003 |
| JP | 2008-260400 | 10/2008 |
| JP | 2008-539126 | 11/2008 |
| JP | 2009-517286 | 4/2009 |
| KR | 101290345 | 7/2013 |
| WO | 2006/117742 | 11/2006 |
| WO | 2012/164458 | 12/2012 |
| WO | 2014/059531 | 4/2014 |

* cited by examiner

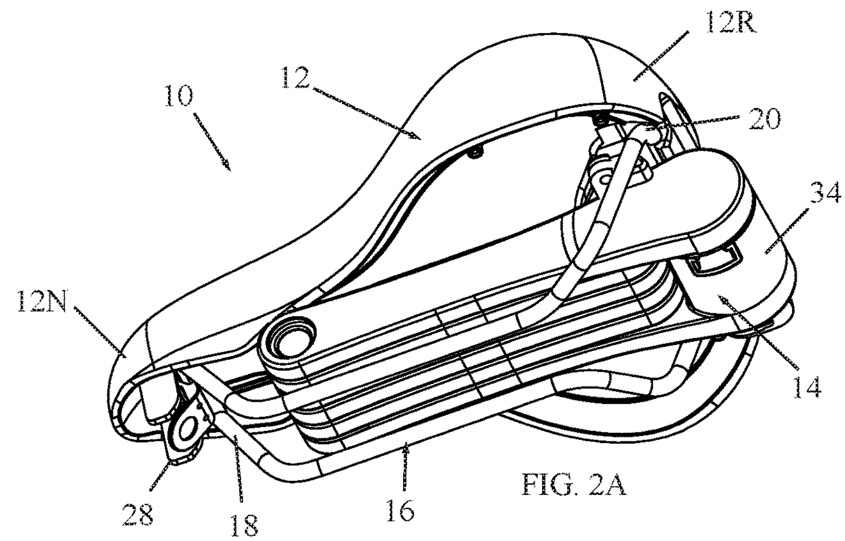
FIG. 2A
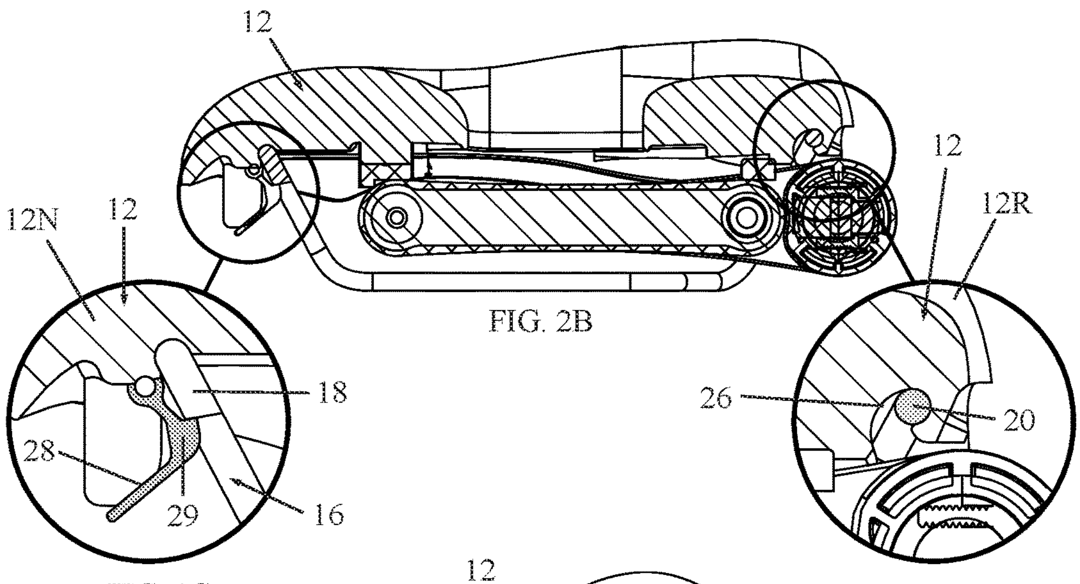
FIG. 2B
FIG. 2C
FIG. 2D
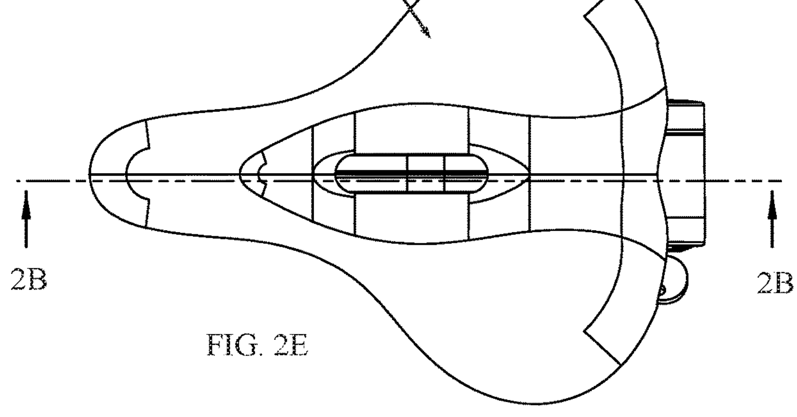
FIG. 2E

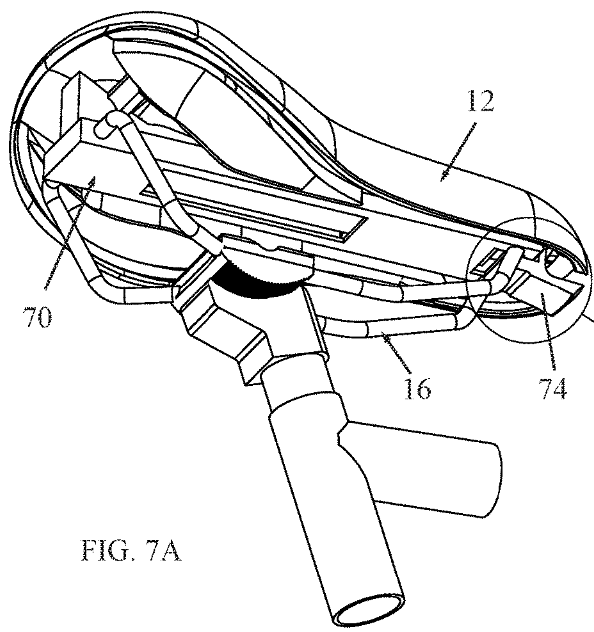
FIG. 7A
FIG. 7B
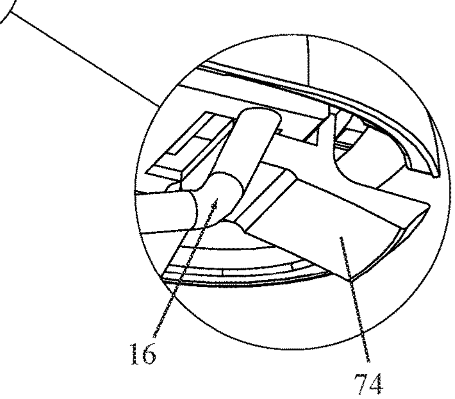
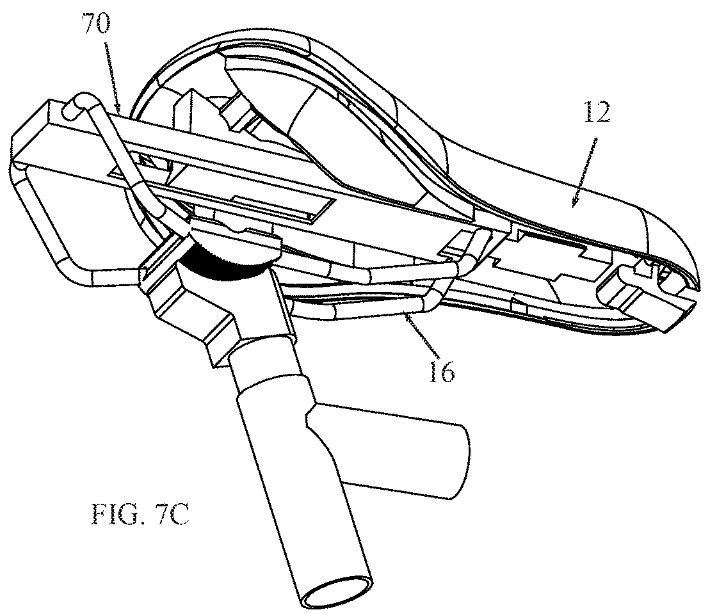
FIG. 7C

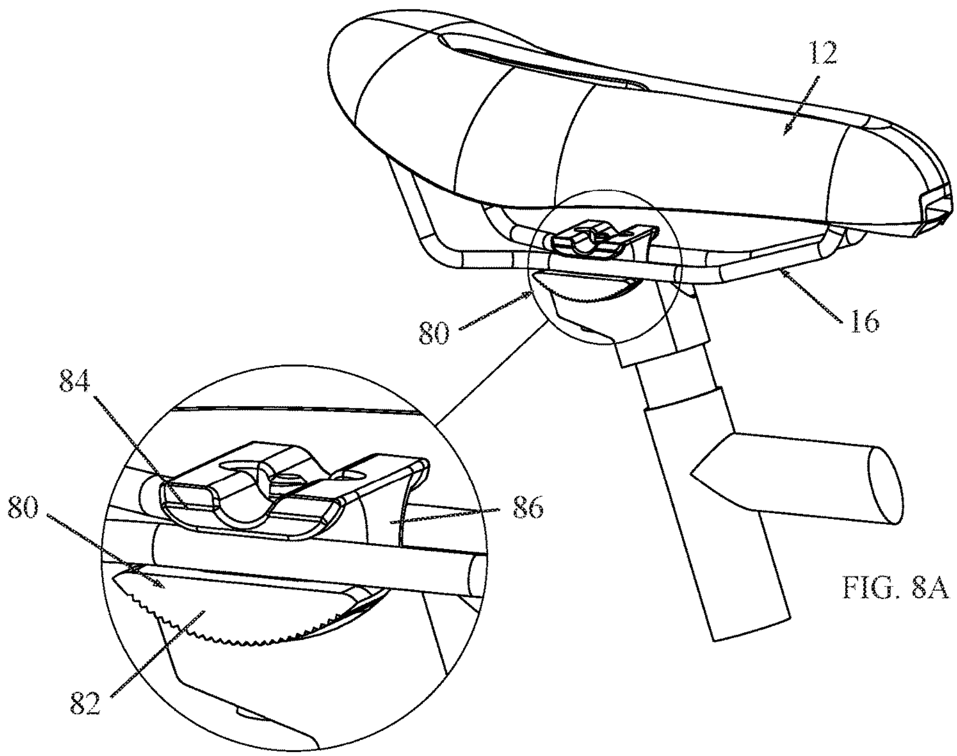
FIG. 8A
FIG. 8B
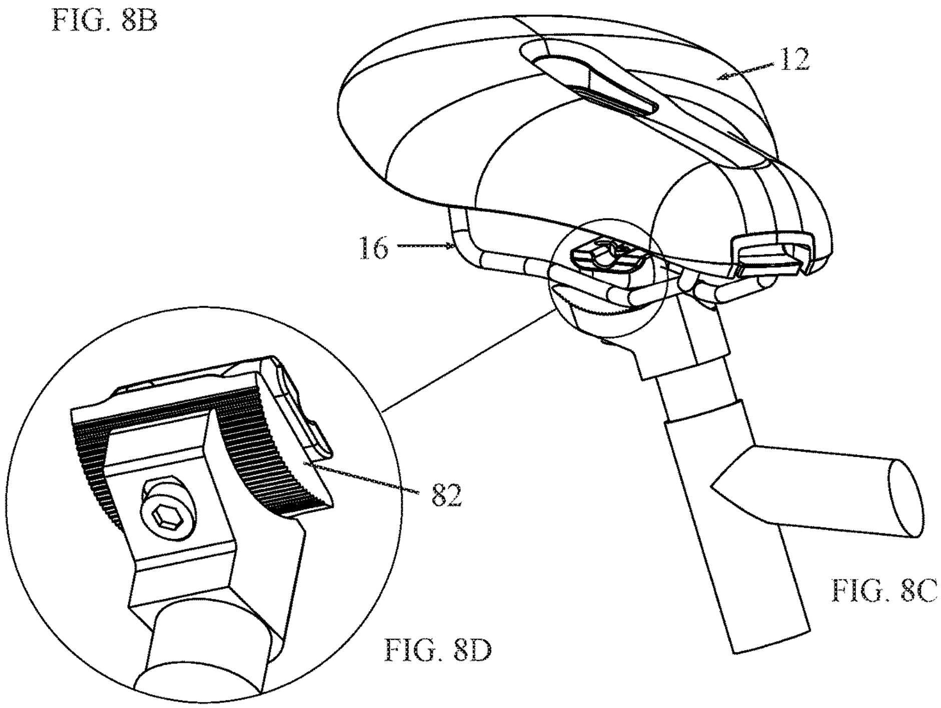
FIG. 8C
FIG. 8D

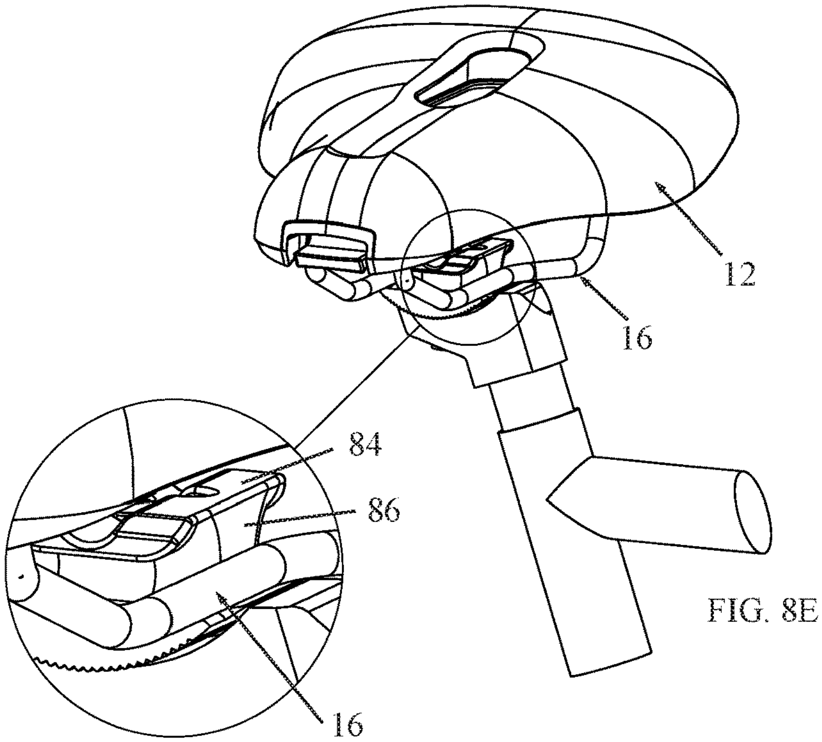
FIG. 8E
FIG. 8F
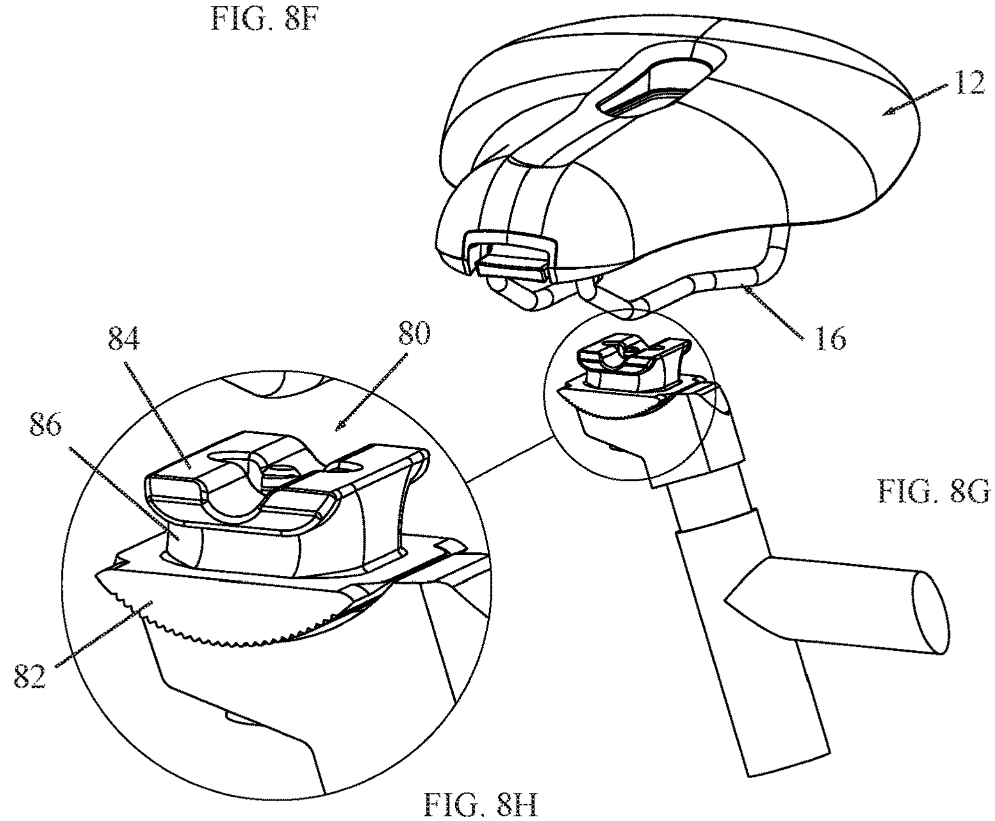
FIG. 8G
FIG. 8H

BICYCLE SEAT AND LOCK ASSEMBLY

FIELD OF THE INVENTION

This invention relates generally to bicycle seats, and particularly to a bicycle seat that attaches to a platform mounted on a bicycle seat post. The bicycle seat may also double as a bicycle lock.

BACKGROUND OF THE INVENTION

There is a major problem of bicycle theft in general, and particularly theft of bicycle seats. Although many bicycle locks are manufactured and marketed, bicycle locks are generally useless in preventing theft of the bicycle seat.

U.S. Pat. No. 8,534,754 to Livne (assigned to InoVision Ltd.) describes a bicycle seat that doubles as a bicycle lock. The bicycle apparatus includes a bicycle seat support member, locking members mechanically linked to the bicycle seat support member, and a lock that locks the locking members to each other. In a first position, the bicycle seat support member is secured to a bicycle seat post of a bicycle for use as a bicycle seat support. In a second position, the bicycle seat support member is arranged for locking the bicycle by being locked with the locking members and the lock.

SUMMARY OF THE INVENTION

The present invention seeks to provide a novel bicycle seat, which attaches to a mounting platform, such as rails, with the possibility of quick release, mounted on a bicycle seat post, as is described more in detail hereinbelow. The bicycle seat may also double as a bicycle lock.

The present invention solves the problem of the bicycle seat theft in two ways. In one method, the bicycle seat is easily removed from the bicycle and can be safely carried in the rider's backpack and the like. In another method, the bicycle seat doubles as a bicycle lock; the seat itself is used to safely lock the bicycle to the bicycle itself or to an external object to prevent theft of the bicycle and its seat.

There is thus provided in accordance with an embodiment of the invention a bicycle seat assembly including a bicycle seat including a nose (front) portion and a rear portion and mounting platform attachable to a bicycle seat post or seat post adaptor of a bicycle, wherein one portion of the bicycle seat releasably attaches to a portion of the mounting rails and another portion of the bicycle seat releasably attaches to another portion of the mounting rails.

In accordance with non-limiting embodiments of the invention, a locking assembly is attached to the bicycle seat.

BRIEF DESCRIPTION OF THE DRAWINGS

The present invention will be understood and appreciated more fully from the following detailed description taken in conjunction with the drawings in which:

FIG. 2A is a simplified lower perspective illustration of the bicycle seat mounted on the rails and detached from the bicycle seat post;

FIGS. 2B, 2C, 2D and 2E are sectional, detail of the saddle nose mounted to the rails, detail of the saddle rear mounted to the rails, and top view, respectively, of the bicycle seat, FIG. 2B being taken along lines 2B-2B in FIG. 2E;

FIGS. 4A, 4B and 4C are simplified illustrations of the bicycle seat being used as a lock to lock a bicycle to an object, wherein FIG. 4A illustrates the bicycle seat removed from the rails and the locking members in an unfolded, fully stretched position, being inserted between spokes of the bicycle wheel, FIG. 4B illustrates the bicycle seat and the locking members fully inserted between spokes of the bicycle wheel and about to be folded to a locked position, and FIG. 4C illustrates the bicycle seat locking the bicycle to the object.

FIGS. 7A-7E are simplified pictorial illustrations of releasable and non-pivoting attachment of the bicycle seat to the platform, in accordance with another embodiment of the invention; and FIGS. 8A-8H are simplified pictorial illustrations of a method and apparatus for releasing the mounting platform from the bicycle seat post, in accordance with an embodiment of the invention.

DETAILED DESCRIPTION OF EMBODIMENTS

Reference is now made to FIGS. 1A-1F, which illustrate a bicycle seat assembly 10, constructed and operative in accordance with a non-limiting embodiment of the present invention.

The bicycle seat assembly 10 includes a bicycle seat 12, which may include a lower shell member 12A and an upper cover member 12B, which may be padded, anatomically shaped or of any size and style used for bicycle seats (e.g., banana, no-nose, leather, plastic, carbon composites, etc.), or a uniform seat that is made of one material such as a carbon seat In one embodiment of the invention, a locking assembly 14 is attached to seat 12 (e.g., the underside of the seat 12).

Figure 5A:
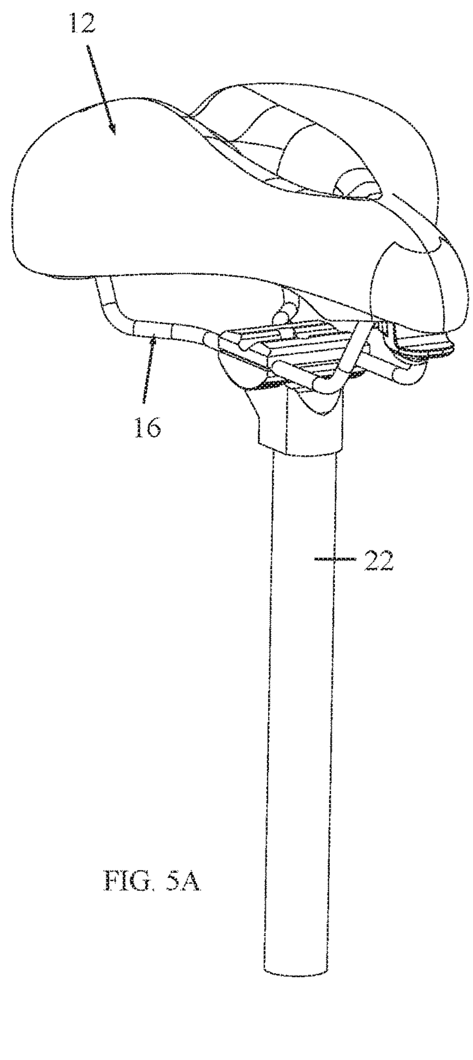
FIGS. 5A and 5B are simplified pictorial illustrations of using the bicycle seat without the locking assembly, in accordance with another embodiment of the invention.
Figure 5B:
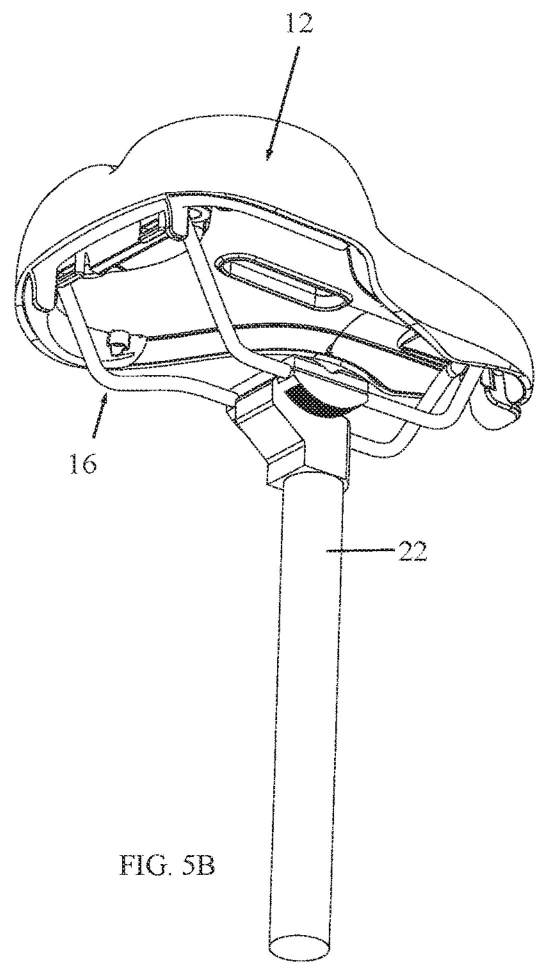

The locking assembly 14 is described more in detail below. In another embodiment of the invention, the bicycle seat 12 can be used without locking assembly 14, and this is illustrated in FIGS. 5A and 5B.

Figure 1A:
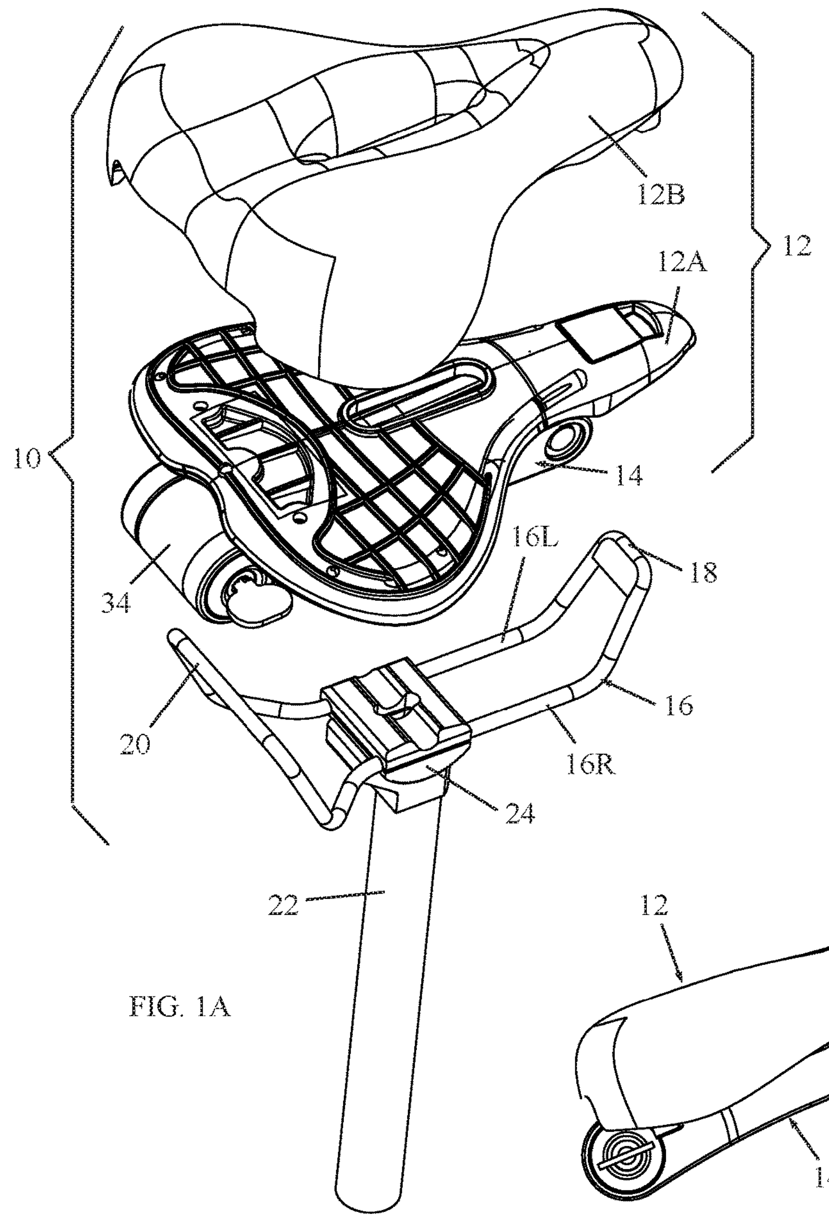
FIGS. 1A, 1B, 1C, 1D and 1E are simplified exploded, side-view (with seat not attached to rails), side-view (with seat attached to back of rails and tilted upwards), side-view (with seat fully attached to rails) and lower perspective illustrations, respectively, of a bicycle seat assembly, including a combination bicycle seat and bicycle lock with mounting rails for mounting on a bicycle seat post or seat post adaptor, constructed and operative in accordance with a non-limiting embodiment of the present invention.
Figure 1B:
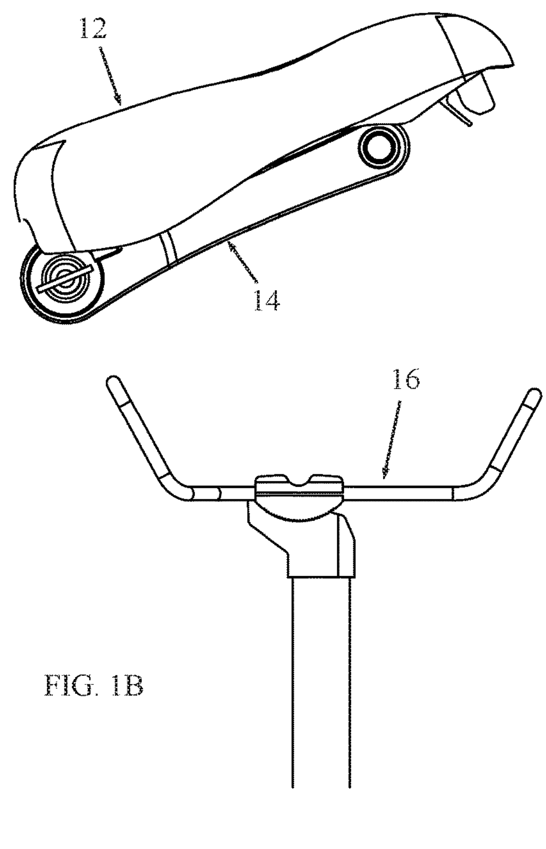
Figure 1C:
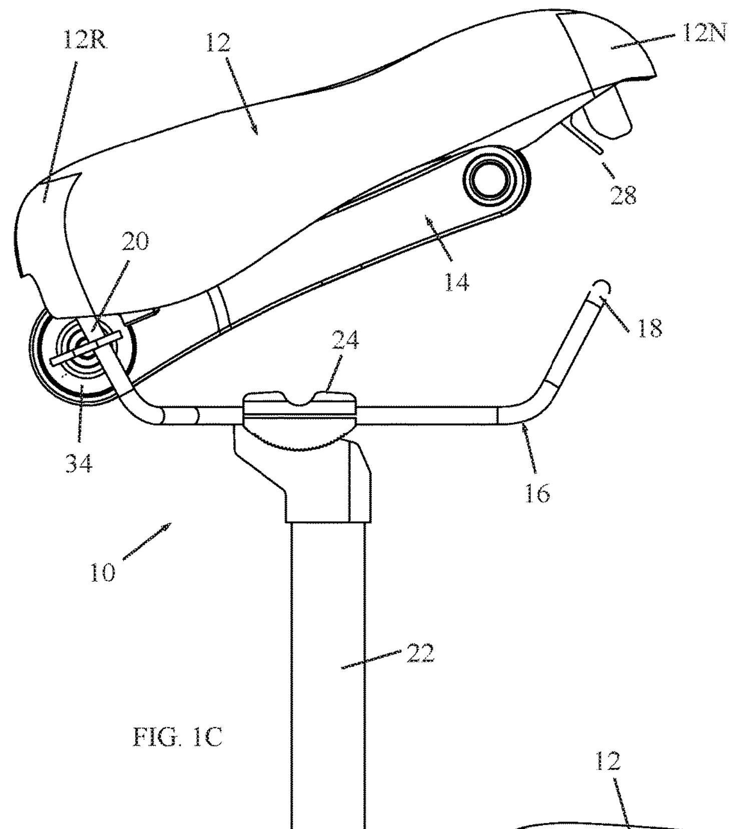
Figure 1D:
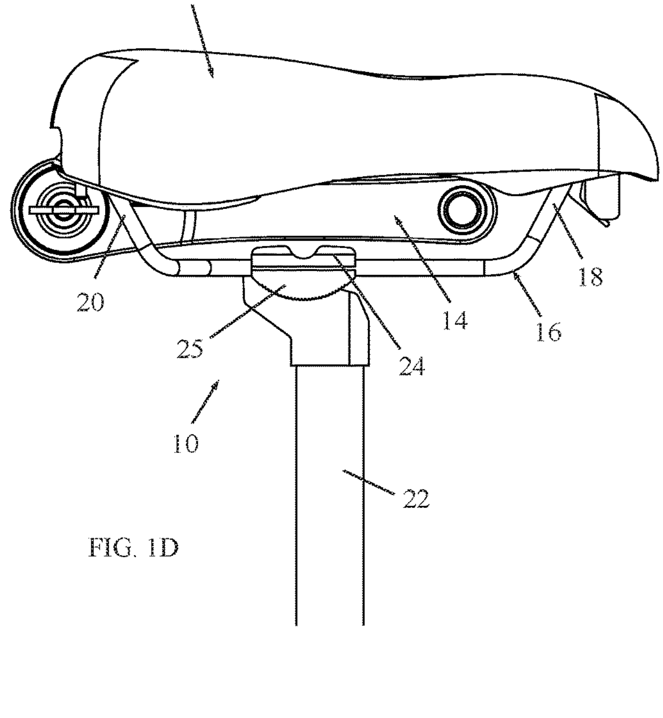
Figure 1E:
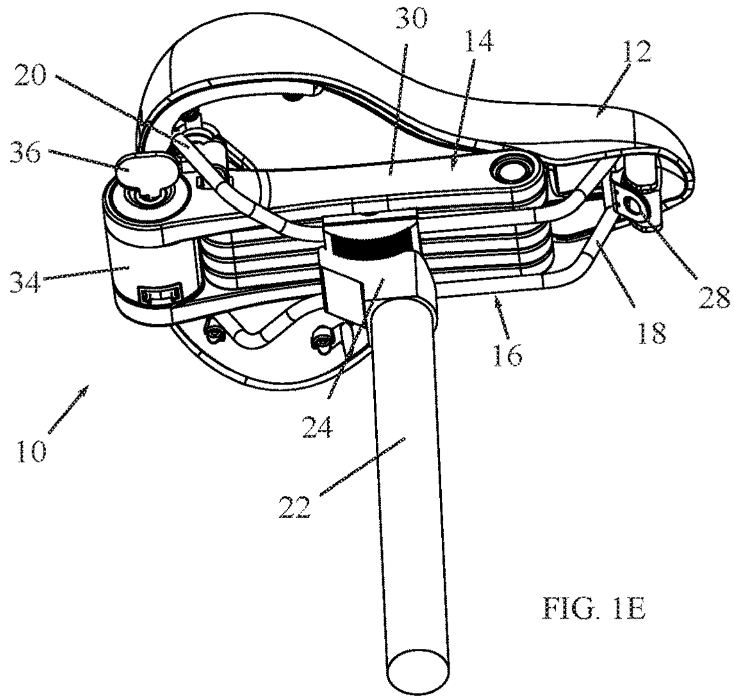
Figure 1F:
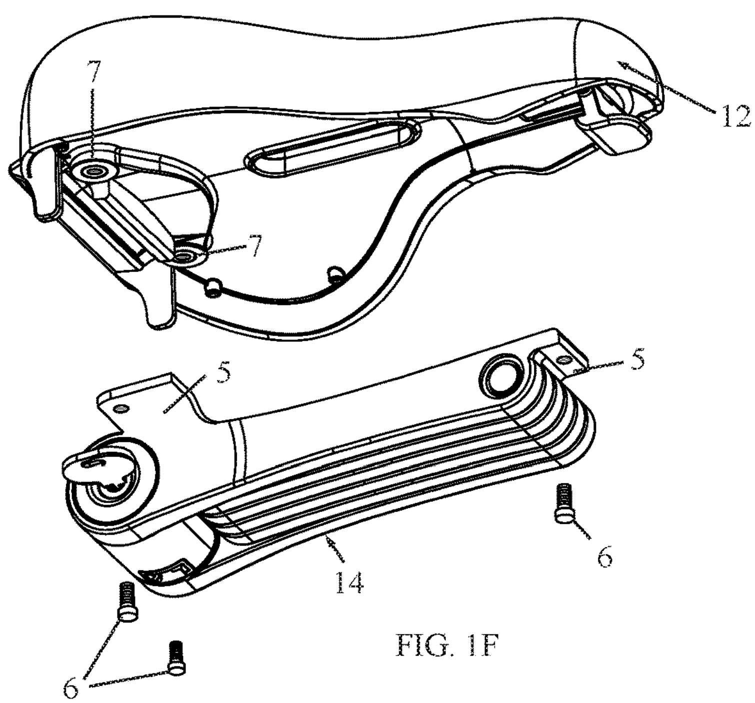
FIG. 1F is a simplified perspective illustration of one exemplary attachment of a locking assembly to the bicycle seat.

FIG. 1F illustrates one possible attachment of locking assembly 14 to seat 12. In this example, locking assembly 14 includes flanges 5 with mounting elements 6 (such as bolts that pass through holes formed in flanges 5) that fasten to mounting members 7 on seat 12 (such as tapped bosses into which the bolts are tightened).

The bicycle seat assembly 10 includes a mounting platform 16, which in the illustrated embodiment are rails 16. As seen best in FIG. 1A, in one embodiment, platform 16 include left and right rail members 16L and 16R, respectively, which join together in a forward portion of the platform 16 to form an upwardly tilted nose (front) member 18. The left and right rail members 16L and 16R join together in a rearward portion of the rails 16 to form a tail (rear) member 20, which is upwardly tilted. Alternatively, both nose member 18 and tail member 20 may be generally horizontal with respect to the ground or may be tilted downwards. Rails 16 mount on a bicycle seat post 22 with a fastener 24, such as a clamp that clamps down on left and right rail members 16L and 16R. As seen in FIG. 1D, the fastener 24 may have a curved portion 25 for adjusting the upward or downward tilt of the seat 12.

FIG. 1B shows seat 12 completely detached from rails 16 (this is the position either before mounting seat 12 on rails 16 or after removing seat 12 from rails 16).

As seen in FIG. 1C, seat 12 attaches to platform 16 by first pivotally mounting a rear portion 12R of seat 12 to the tail member 20 of rails 16. As seen best in FIG. 2D, the rear portion 12R of seat 12 is formed with a groove 26 in which tail member 20 is pivotally received, so that seat 12 can rotate on tail member 20. As seen best in FIG. 2C, a nose (front) portion 12N of seat 12 includes a tab 28 (which may be bent to form an elbow 29) that clicks or snaps on to (that is, releasably attaches to) nose member 18 of rails 16, as the nose portion 12N is moved downwards upon rotating seat 12 on tail member 20 (counterclockwise in the sense of FIG. 2B).

In an alternative embodiment, the seat 12 may be attached to the rails 16 by releasably mounting the nose (front) portion (or some other portion) of the seat to the rails, wherein the rear portion of the seat (or some other portion) releasably attaches to the rails. The parts do not have to pivot but rather can be lifted straight off the rails. The invention can be carried out with other shapes of platforms that permit releasable (not necessarily pivoted) attachment of the seat to the platform, and the term "rails" is used in the description and claims to encompass any such platform. (One non-limiting example of releasable, non-pivoting attachment is shown and described with reference to FIGS. 7A-7E).

Figure 2F:
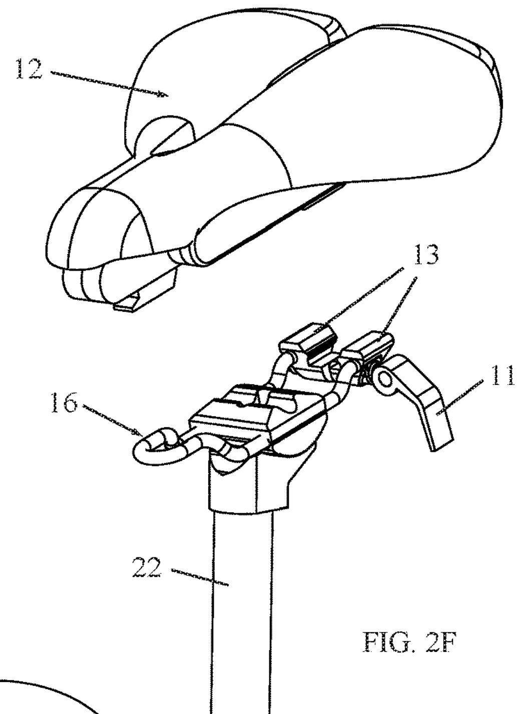
FIGS. 2F and 2G are simplified exploded illustrations of non-pivoting releasable mounting of the bicycle seat to the rails, in accordance with an embodiment of the invention, using a quick release fastener.
Figure 2G:
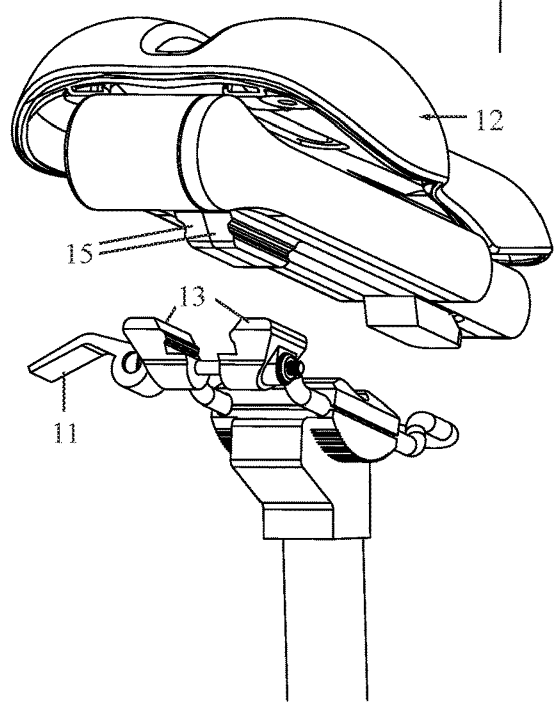
Figure 2H:
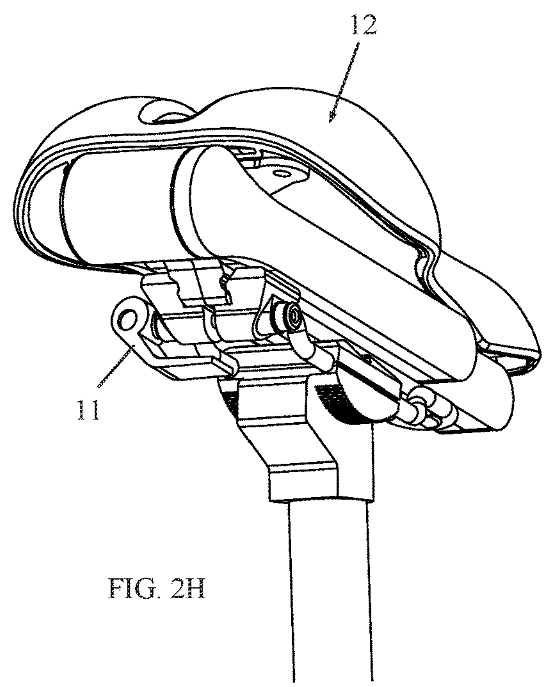
FIG. 2H is a simplified perspective illustration of the bicycle seat mounted on the rails with the quick release fastener.

An example of non-pivoting releasable mounting of the seat 12 to the rails 16 is shown in FIGS. 2F and 2G. In this embodiment, a bicycle seat quick release fastener 11 is used to tighten (or release) clamping members 13 assembled on rails 16, which tighten and engage with (or become disengaged from) corresponding lugs 15 on the underside of seat 12 (FIG. 2F, 2G). FIG. 2H shows the seat 12 attached to rails 16 in this manner.

Figure 3A:
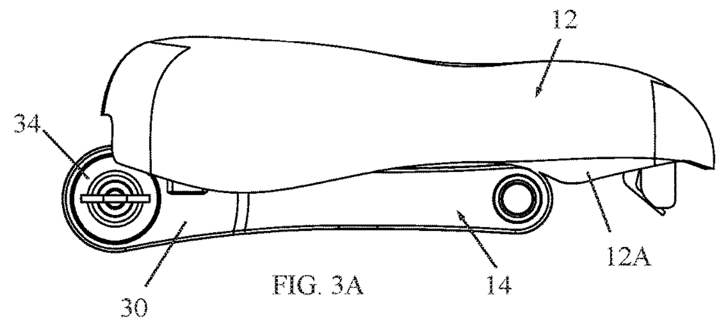
FIGS. 3A, 3B and 3C are simplified illustrations of the bicycle seat with locking members in a folded position, unfolded position and locked position, respectively, in accordance with an embodiment of the present invention.
Figure 3B:
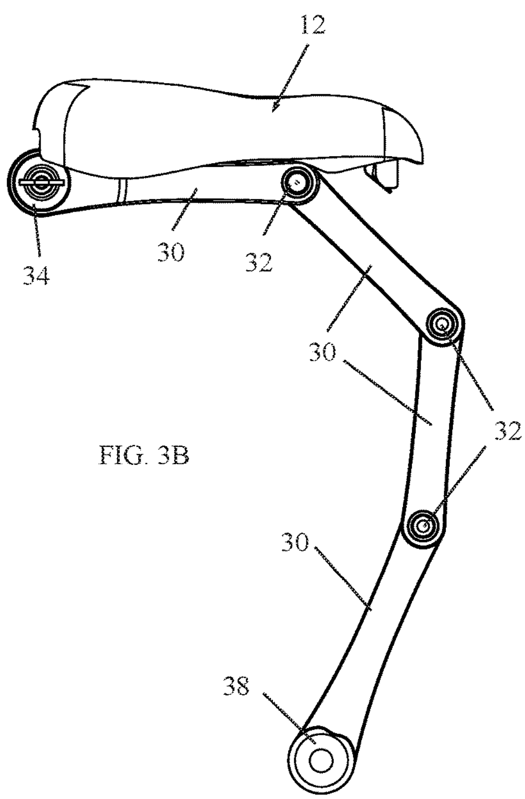
Figure 3C:
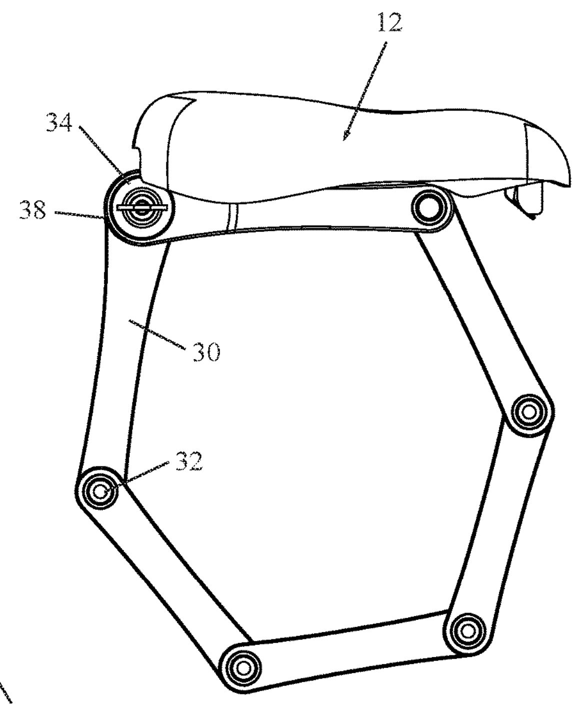

Reference is now made to FIGS. 3A-3C. The locking assembly 14 includes a plurality of locking members 30, which are interconnected to each other, such as by being pivotally connected to one another by pivot links 32. In the illustrated embodiment, there are a total of six (6) locking members 30, but the embodiment is not limited to this number, and the embodiment can have just two locking members 30 or more than 6. Locking members 30 are preferably made of a steel alloy, hardened against cutting or other vandalistic forces (or any other suitable material). One of the locking members 30 may be secured to lower shell member 12A and may be connected to a locking device, such as a cylinder lock 34. As seen in FIG. 1D, cylinder lock 34 is operated by a key 36. Turning the key 36 opens the cylinder lock 34 and releases a lock insert member 38 (FIG. 3B and also seen in FIG. 4B) mounted on the end of one of the locking members 30, so as to permit unfolding and stretching out the locking members 30. (In FIG. 3B, not all of the locking members 30 are seen because two members are still folded in.) FIG. 3C illustrates the locked position, wherein the lock insert member 38 is re-inserted and locked into cylinder lock 34. The locking member 30 that is secured to lower shell member 12A may be fixed with respect to lower shell member 12A or may be pivotally attached to lower shell member 12A.

Figure 3D:
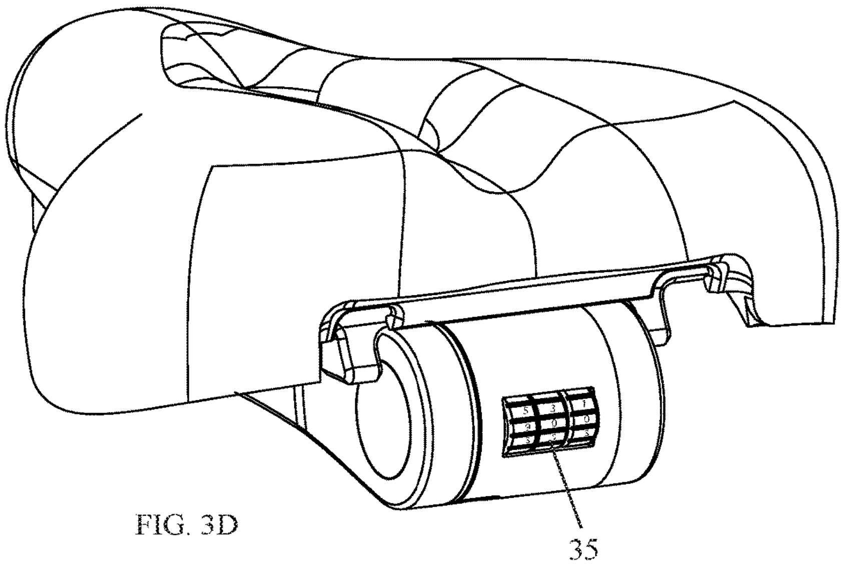
FIGS. 3D and 3E are simplified illustrations of different locks (combination and RFID, respectively), which may be used with the bicycle seat of the invention.
Figure 3E:
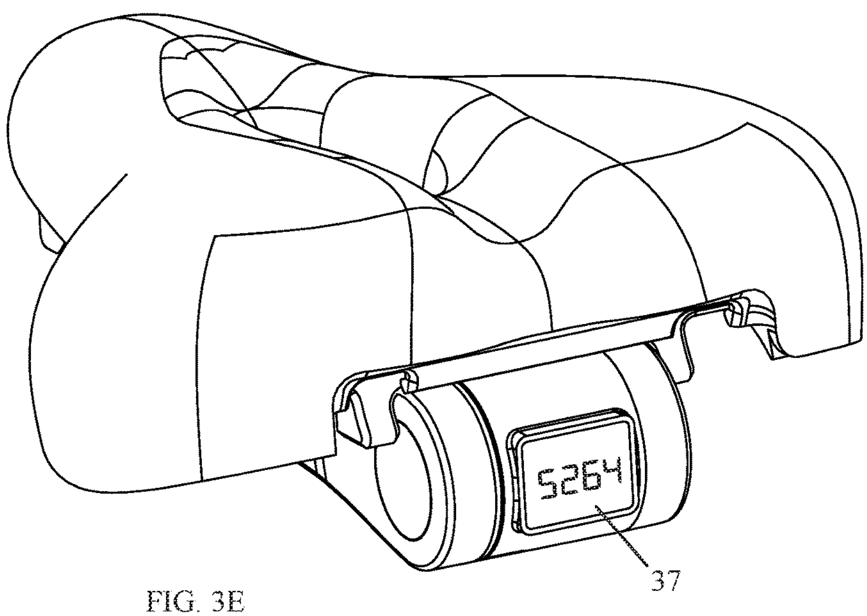

Reference is now made to FIGS. 3D and 3E, which illustrate other types of locking devices which can be used with the invention. In FIG. 3D, the lock is a combination lock 35. In FIG. 3E, the lock is a wireless communication lock 37 (that operates with a transponder that communicates with identification circuitry in the lock to gain authorized access to the lock). Non-limiting examples of the wireless communication lock include an RFID lock, NFC lock, Bluetooth lock, Wi-Fi lock, mobile device, and others. Other locking types can also be used.

Figure 4A:
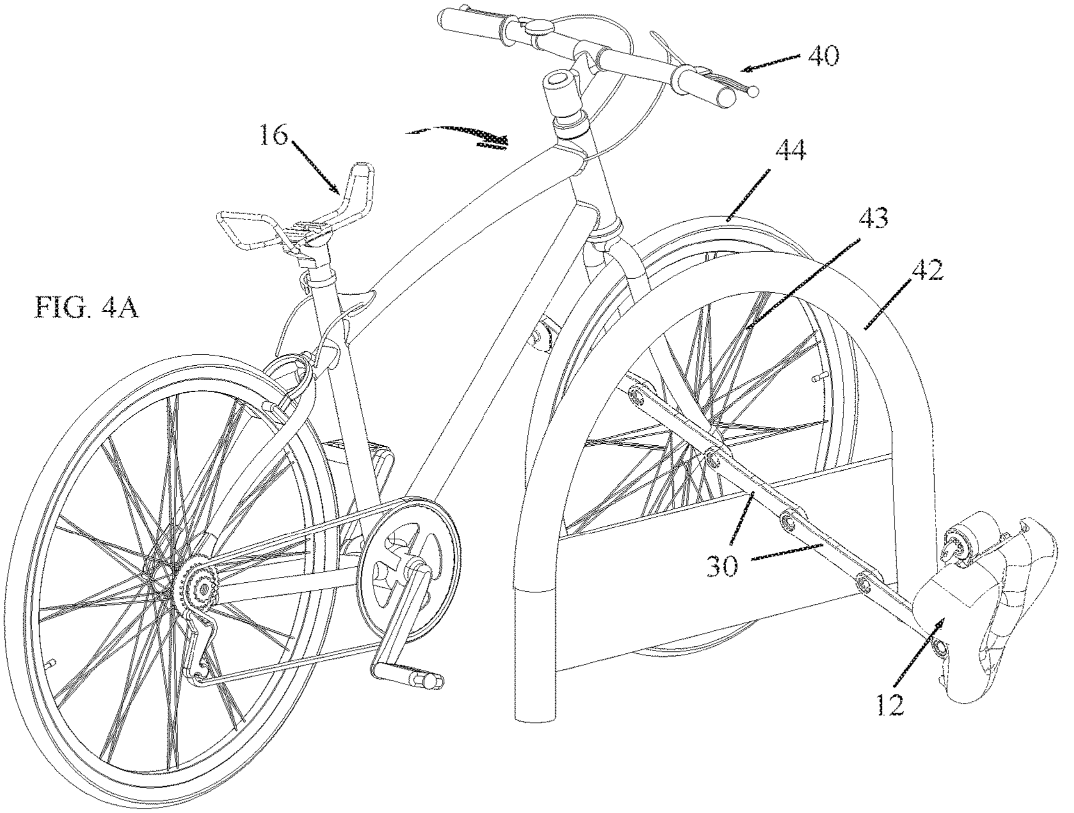
Figure 4B:
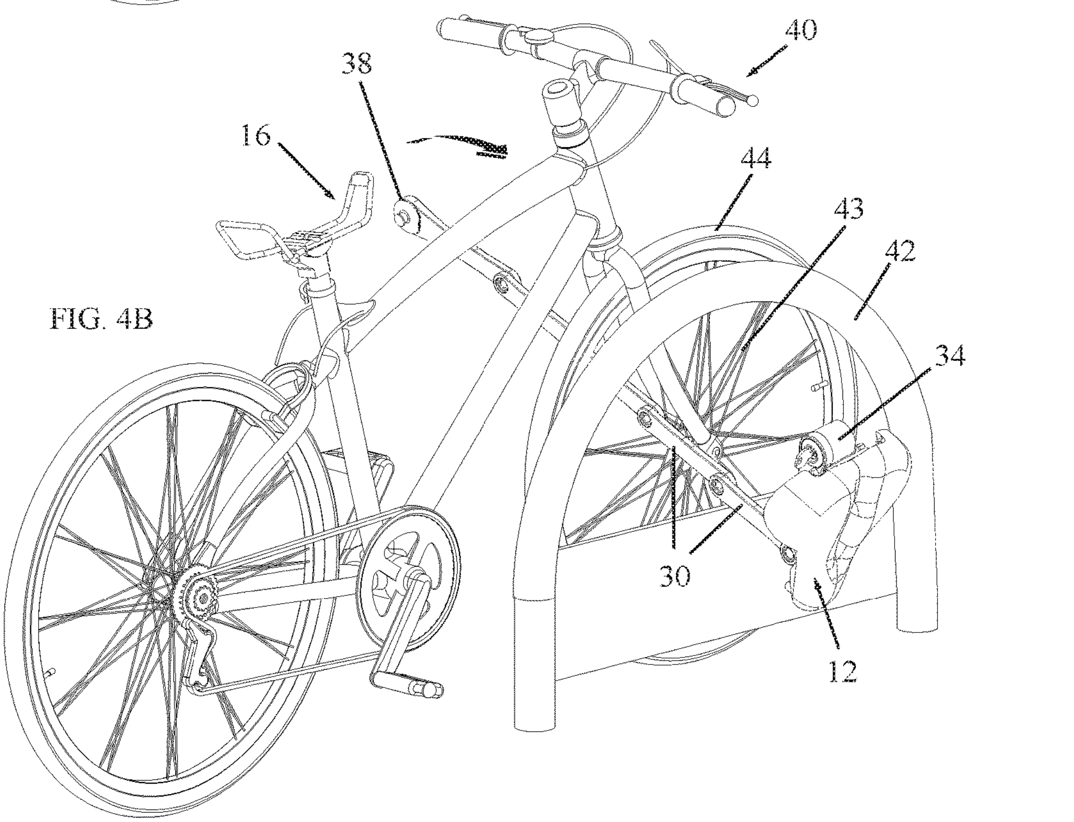
Figure 4C:
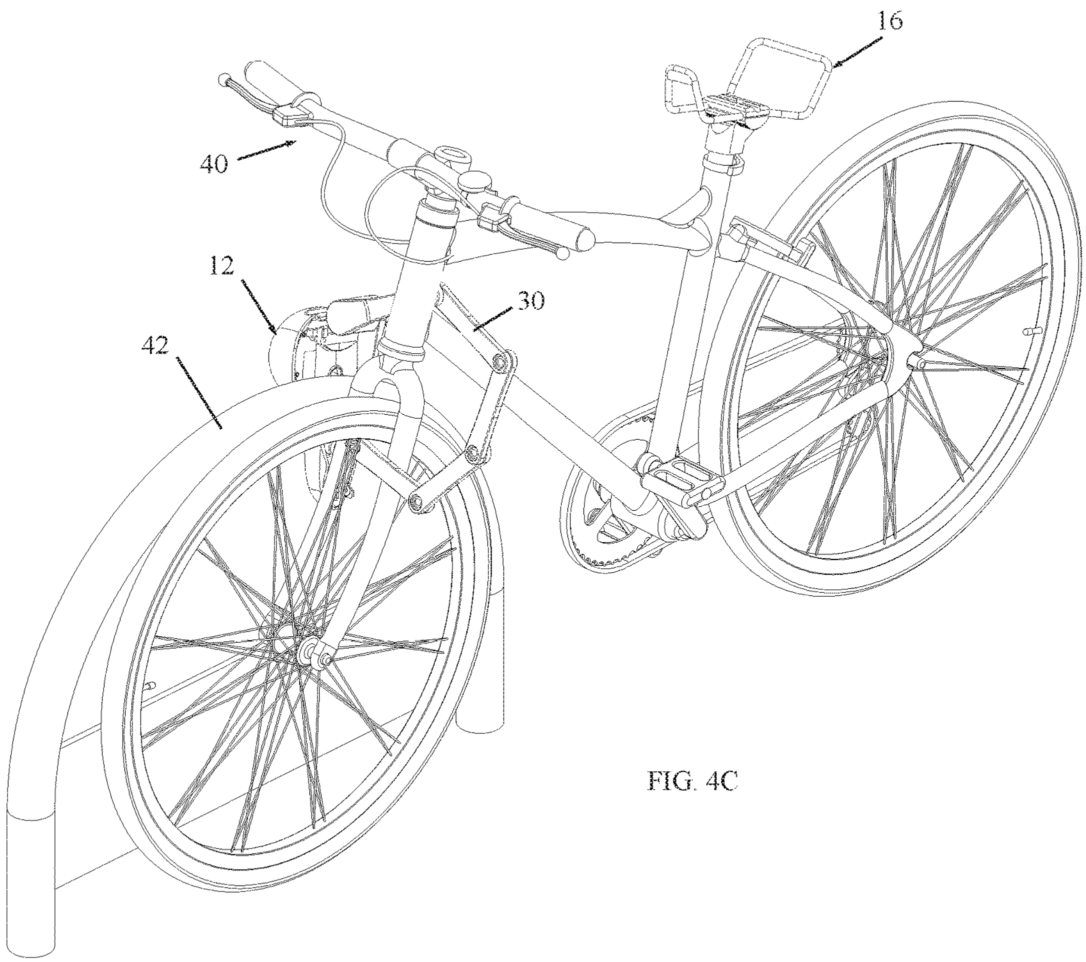

Reference is now made to FIGS. 4A-4C, which illustrate the bicycle seat 12 being used as a lock to lock a bicycle 40 to an object 42 (such as a bicycle stand). FIG. 4A illustrates the bicycle seat 12 removed from the platform 16 and the locking members 30 in an unfolded, fully stretched position, being inserted between spokes 43 of a bicycle wheel 44. FIG. 4B illustrates the bicycle seat 12 and the locking members 30 fully inserted between spokes 43 of the bicycle wheel 44 and about to be folded to a locked position. FIG. 4C illustrates the bicycle seat 12 locking the bicycle 40 to the object 42.

Figure 6A:
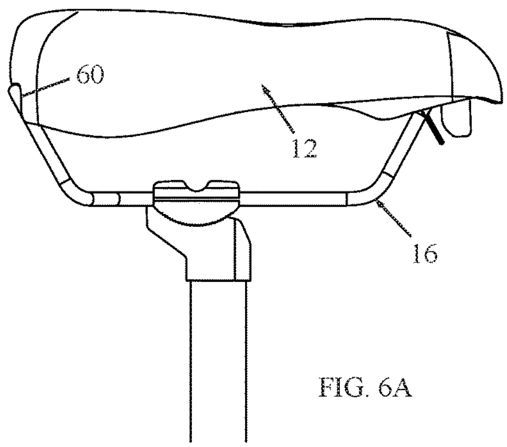
FIGS. 6A, 6B and 6C are simplified side-view illustrations of a bicycle seat assembly without the locking assembly, constructed and operative in accordance with another non-limiting embodiment of the present invention, respectively attached, partially attached and detached from the bicycle seat post.
Figure 6B:
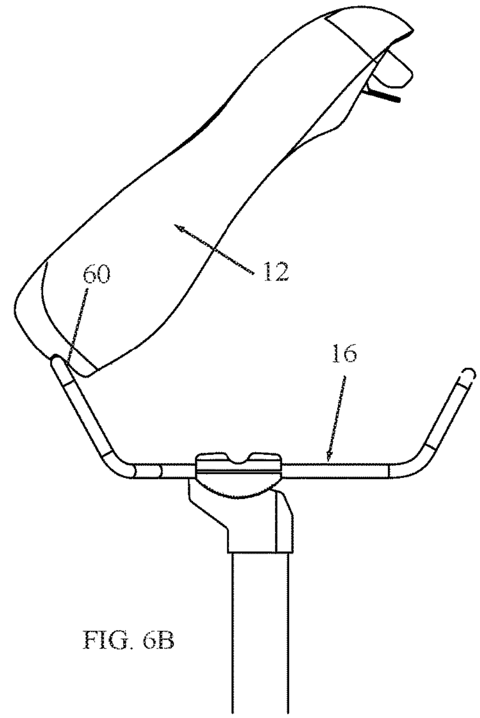
Figure 6C:
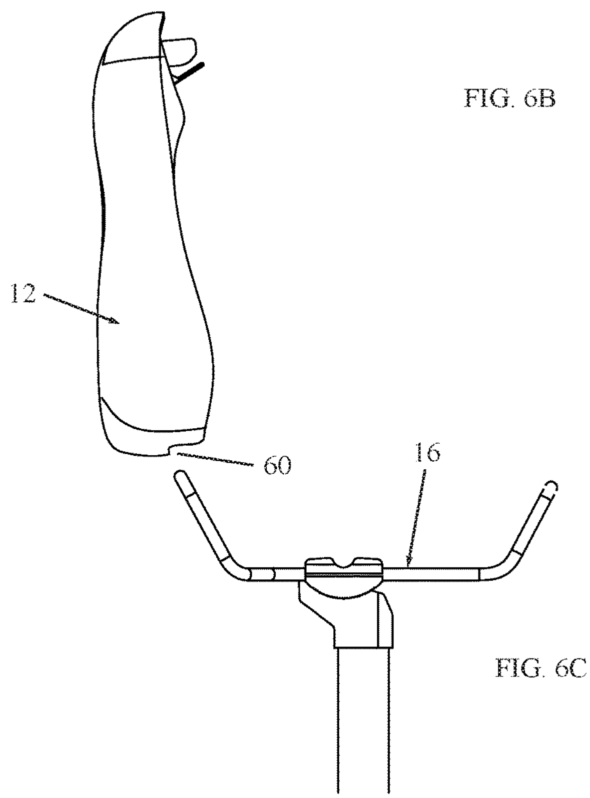
Figure 7D:
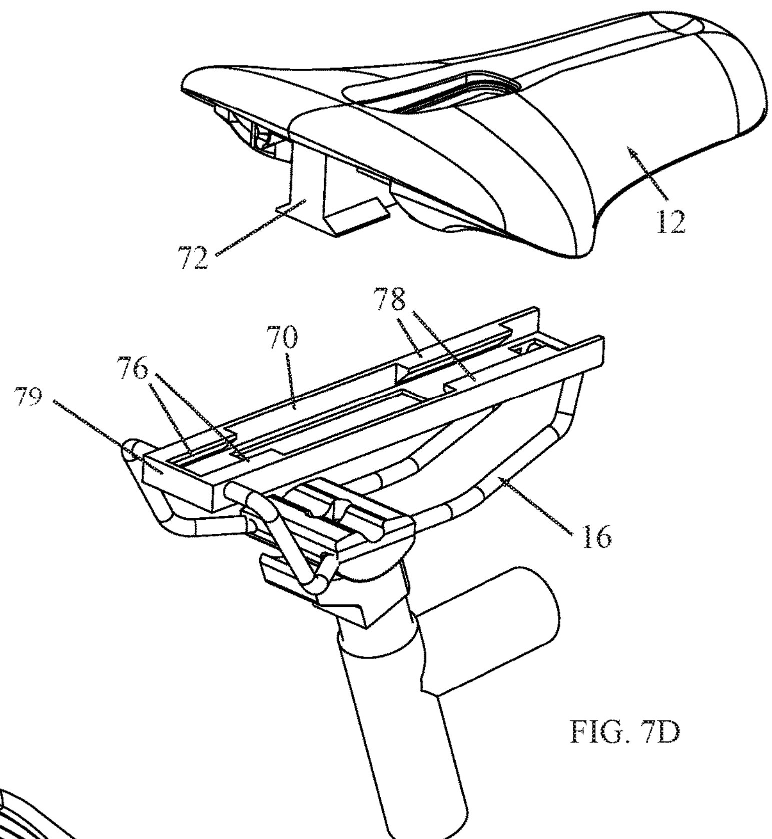
Figure 7E:
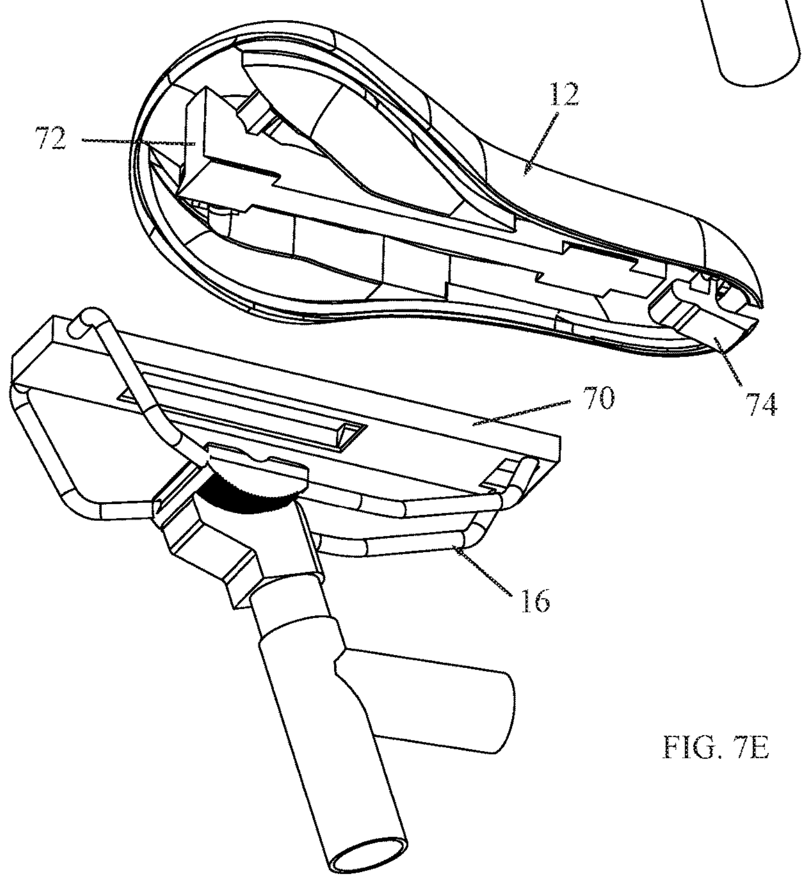

Reference is now made to FIGS. 6A, 6B and 6C, which illustrate another version of the bicycle seat assembly without the locking assembly. In this version, the bicycle seat 12 pivots with respect to the platform 16 by means of a pivot groove 60 formed in the rear portion of the seat. Other elements may be as described above. In this way, one can release and remove the seat from the platform quickly and easily.

Reference is now made to FIGS. 7A-7E, which illustrate releasable and non-pivoting attachment of the bicycle seat 12 to the platform 16, in accordance with another embodiment of the invention. In this embodiment, platform 16 includes a chassis 70 affixed to the rails. The underside of seat 12 includes a male dovetail member 72 and a forward portion of the underside of the seat includes a tab 74. Chassis 70 is formed with a rearward female dovetail receiving portion 76 (FIG. 7D) and abutments 78 towards the front part of the chassis. The seat 12 is easily mounted on chassis 70 by sliding the male dovetail member 72 rearwards until it is received in female dovetail receiving portion 76 and tab 74 clicks or otherwise is resiliently received on the front part of rails 16. The seat 12 is easily released by pushing up on tab 74 to release the tab from the rails and then sliding the seat forward to release male dovetail member 72 from female dovetail receiving portion 76. The abutments 78 limit the frontward travel of seat 12. Alternatively, the male dovetail member may be on the chassis 70 and the female dovetail member on the seat 12. In general, the arrangement is referred to as the seat 12 and the mounting platform 16 (e.g., chassis 70) having a male-female dovetail attachment.

Reference is now made to FIGS. 8A-8H, which illustrate a method and apparatus for releasing the mounting platform from the bicycle seat post, in accordance with an embodiment of the invention. In this embodiment, a seat post adaptor 80 (which alternatively may be the bicycle seat post itself) includes a lower arcuate (semi-circular cross-section) mounting member 82 (which may be formed with serrations on its outer contour) and an upper flange 84 which extends from a pillar 86 which is narrower in the front-rear direction than in the sideways direction. The rails 16 are secured between upper flange 84 and arcuate mounting member 82. The rails are flexible and are tightly fit around pillar 86, because the pillar is relatively wide in the sideways direction and the flexibility of the rails makes them tightly hug the pillar, so that the seat does not move during riding (an optional fastener may be used to fasten the seat in the riding position). When it is desired to remove the seat 12 and rails 16 from the seat post adaptor 80, the seat 12 is turned 90° so that the rails 16 are now between the narrower front-rear portion of seat post adaptor 80. Because this portion is narrower, the rails do not tightly hug the seat post adaptor 80 and the seat 12 with rails 16 can be lifted off seat post adaptor 80. In general, seat 12 and rails (mounting platform) 16 have a riding position and a detachment position. In the riding position, seat 12 and rails 16 are secured to the seat post or seat post adaptor and the front of the seat 12 points to the front of the bicycle. In the detachment position, seat 12 and rails 16 are turned (such as in azimuth, that is, around a vertical axis extending through the seat post), so that the front of the seat 12 does not point to the front of the bicycle, and the seat and rails are simply lifted off the seat post or seat post adaptor without the need for releasing any fasteners. The angle through which the seat 12 is turned is not necessarily 90°, but includes other angular ranges, such as but not limited to, 30-120°. The seat may be turned in other ways, such as in elevation, wherein the seat is tilted upwards or downwards in order to detach the seat from the seat post.

What is claimed is:

1. A bicycle seat assembly comprising:

a bicycle seat comprising a front portion and a rear portion; and a mounting platform attachable to a bicycle seat post or seat post adaptor of a bicycle, wherein a first portion of said bicycle seat releasably attaches to a portion of said mounting platform and wherein a second portion of said bicycle seat, independently of attachment of the first portion of said bicycle seat, releasably attaches to another portion of said mounting platform;

wherein said mounting platforms comprises a front member and a rear member, and said rear portion of said bicycle seat releasably attaches to said rear member and said front portion of said bicycle seat releasably attaches to said front member.

2. The bicycle seat assembly according to claim 1, wherein said rear portion of said bicycle seat is formed with a groove in which said rear member is pivotally received, so that said bicycle seat can rotate on said rear member.

3. The bicycle seat assembly according to claim 1, wherein said front portion of said bicycle seat comprises a tab that snaps on to said front member of said mounting platform or rails.

4. The bicycle seat assembly according to claim 1, further comprising a locking assembly attached to said bicycle seat.

5. The bicycle seat assembly according to claim 4, wherein said locking assembly comprises a plurality of locking members interconnected to one another and a locking device connected to at least one of said locking members.

6. The bicycle seat assembly according to claim 4, wherein said locking device comprises a cylinder lock.

7. The bicycle seat assembly according to claim 4, wherein said locking device comprises a combination lock.

8. The bicycle seat assembly according to claim 4, wherein said locking device comprises a wireless communication lock.

9. The bicycle seat assembly according to claim 1, wherein said mounting platform or rails comprise a front member and a rear member, and said rear portion of said bicycle seat is releasably attached to said rear member with a quick release fastener, and a nose portion of said bicycle seat is releasably attached to said front member.

10. The bicycle seat assembly according to claim 1, wherein said seat and said mounting platform comprise a male-female dovetail attachment.

11. A bicycle seat assembly comprising:

a bicycle seat comprising a front portion and a rear portion; and mounting rails attachable to a bicycle seat post or seat post adaptor of a bicycle, wherein said front portion of said bicycle seat releasably attaches to a front portion of said mounting rails and said rear portion of said bicycle seat, independently of attachment of the front portion of said bicycle seat, releasably attaches to a rear portion of said mounting rails;

wherein said mounting rails comprise left and right members which join together in a forward portion of said mounting rails to form a front member, which is upwardly tilted, and said left and right rail member join together in a rearward portion of said mounting rails to form a rear member, which is upwardly tilted.

12. The bicycle seat assembly according to claim 11, wherein said mounting rails comprise a front member and a rear member, and said rear portion of said bicycle seat releasably attaches to said rear member and said front portion of said bicycle seat releasably attaches to said front member.

13. The bicycle seat assembly according to claim 11, further comprising a locking assembly attached to said bicycle seat.

14. The bicycle seat assembly according to claim 11, wherein said mounting rails comprise a front member and a rear member, and said rear portion of said bicycle seat is releasably attached to said rear member with a quick release fastener, and said nose portion of said bicycle seat is releasably attached to said front member.

15. The bicycle seat assembly according to claim 11, wherein said seat and said mounting rails comprise a male-female dovetail attachment.

* * * * *